(12) United States Patent
Hahm

(10) Patent No.: US 11,628,759 B2
(45) Date of Patent: Apr. 18, 2023

(54) GAP WALL FOR GAP FILLER BETWEEN SEAT AND ADJACENT BARRIER

(71) Applicant: The Private Brands LLC, Fort Lee, NJ (US)

(72) Inventor: Jonathan Hahm, Fort Lee, NJ (US)

(73) Assignee: Ths Private Brands LLC, Fort Lee, NJ (US)

( * ) Notice: Subject to any disclaimer, the term of this patent is extended or adjusted under 35 U.S.C. 154(b) by 0 days.

(21) Appl. No.: 17/688,954

(22) Filed: Mar. 8, 2022

(65) Prior Publication Data

US 2022/0194277 A1 Jun. 23, 2022

Related U.S. Application Data

(63) Continuation of application No. 17/092,281, filed on Nov. 8, 2020, now abandoned, which is a continuation-in-part of application No. 29/756,183, filed on Oct. 27, 2020.

(51) Int. Cl.
*B60N 3/10* (2006.01)
*B60N 2/70* (2006.01)

(52) U.S. Cl.
CPC ........... *B60N 3/103* (2013.01); *B60N 2/7005* (2013.01)

(58) Field of Classification Search
CPC ............................ B60N 2/7005; B60N 3/103
See application file for complete search history.

(56) References Cited

U.S. PATENT DOCUMENTS

| | | | | |
|---|---|---|---|---|
| 6,149,229 A * | 11/2000 | Dillon, Jr. | ............... | B60R 7/043 297/188.2 |
| 7,758,090 B2 * | 7/2010 | Gregory | ............... | B60N 2/6009 297/182 |
| 8,162,189 B2 * | 4/2012 | Robins | ................ | B60N 2/6009 297/182 |
| 8,267,291 B2 | 9/2012 | Simon et al. | | |
| 8,282,161 B1 * | 10/2012 | Jacobson | ................ | B60R 7/043 297/188.2 |
| 8,672,401 B2 * | 3/2014 | Schreiber | ................ | B60N 2/24 5/652 |
| 9,174,561 B1 * | 11/2015 | Ferlisi Wilson | ......... | B60N 3/00 |
| 9,199,561 B2 | 12/2015 | Fung | | |
| 9,475,418 B2 * | 10/2016 | Goldman | ............... | B60N 3/108 |
| 9,868,375 B1 * | 1/2018 | Kachel | ...... | B60N 3/08 |
| 2007/0241581 A1 * | 10/2007 | Martin | ..................... | B60N 3/00 296/37.8 |
| 2010/0231010 A1 | 9/2010 | Manley | | |
| 2011/0266820 A1 * | 11/2011 | Hurwitz | ............... | B60N 2/6009 296/1.07 |

(Continued)

*Primary Examiner* — David R Dunn
*Assistant Examiner* — Tania Abraham
(74) *Attorney, Agent, or Firm* — Richard G. Topolewski

(57) ABSTRACT

A gap wall that includes a divider and a base. The divider includes a top end and a bottom end. The base is attached to the bottom end of the divider and the base can attach to a gap filler such that when attached on the gap filler and when the gap filler is installed between a seat and an adjacent barrier, the divider forms one wall of a pocket. The divider may be compressible. The divider may have an exterior fabric that creates an interior, and the interior may have stuffing. The exterior fabric may be leather. The gap wall may have a closable opening that can be used to adjust the amount of stuffing in the interior. The closable opening may use a zipper.

18 Claims, 11 Drawing Sheets

(56) References Cited

U.S. PATENT DOCUMENTS

| | | | |
|---|---|---|---|
| 2012/0228905 A1* | 9/2012 | Arizpe | B60N 2/24 |
| | | | 297/182 |
| 2015/0076872 A1* | 3/2015 | Carithers | A47C 7/62 |
| | | | 297/182 |
| 2017/0267188 A1* | 9/2017 | Wilkinson | B60R 11/02 |
| 2018/0251074 A1* | 9/2018 | Wang | B60R 7/043 |
| 2020/0406824 A1* | 12/2020 | Esswein | B60N 3/103 |

* cited by examiner

GAP WALL FOR GAP FILLER BETWEEN SEAT AND ADJACENT BARRIER

CROSS-REFERENCE TO RELATED APPLICATIONS

This application is a Continuation of U.S. patent application Ser. No. 17/092,281, filed Nov. 8, 2020, which is incorporated by reference herein in its entirety. This application is a Continuation in Part of U.S. Design patent application No. 29/756,183, filed Oct. 27, 2020, which is incorporated by reference herein in its entirety.

BACKGROUND

Technical Field

The present disclosure relates generally to gap fillers that install on the side of seats to stop items from falling under seats, more specifically making the gap filler more useful to keep and store items for convenient access.

Background

Cars often have seats with a center console, and it is known and frustrating that items often will fall in the gap between the seat and the center console. When items, for example cell phones, fall in the gap it can be dangerous if a person driving tries to reach down to retrieve the item. In recent years, gap filler products that are pliable cylinders filled with stuffing and hook over the car seat belt latch to fit between the seat and the center console have been successful in blocking the gap. Although this stops items from falling through the gap, it still leaves the gap as wasted space in a vehicle.

Therefore, there is a need for an improved gap filler that cannot only block the gap but also make use of the space between the seat and the center console.

SUMMARY OF THE INVENTION

This document describes a gap wall that includes a divider and a base. The divider includes a top end and a bottom end. The base is attached to the bottom end of the divider and the base can attach to a gap filler such that when attached on the gap filler and when the gap filler is installed between a seat and an adjacent barrier, the divider forms one wall of a pocket. The divider may be compressible. The divider may have an exterior fabric that creates an interior, and the interior may have stuffing. The exterior fabric may be leather. The gap wall may have a closable opening that can be used to adjust the amount of stuffing in the interior. The closable opening may use a zipper. The divider may be flexible.

This disclosure further describes a gap pocket maker that includes a gap filler and a gap wall. The gap filler may be an elongated member with one end of the elongated member being a tail end and on the opposite end a front end, and in between a bottom side. The gap wall includes a divider and a base, where divider is attached to the base and the base can attach to the gap filler and when attached the divider extends away from the gap filler. The front end of the gap filler may have a holder with a bottom and a side wall and be open on the top forming an enclosure for holding items. The side wall, when viewed from the top, may be tear drop shaped. The gap wall may be compressible. The gap filler may have an interior and a closable opening to access the interior that can be used to adjust the amount of stuffing in the interior. The closable opening may have a zipper and may be located on the bottom.

The gap filler may be an elongated member with a tail end, a front end, a left side, a right side and a bottom side, where the tail end has a left holder strap on the left side. The left holder strap is attached to the gap filler at the front of the left holder strap and attached at the back of the left holder strap creating a left opening for a first seat belt latch (e.g. a driver seat belt latch) to fit into. The tail end has a right holder strap on the right side. The right holder strap is attached to the gap filler at the front of the right holder strap and attached at the back of the right holder strap creating a right opening for a second seat belt latch (e.g. a passenger seat belt latch) to lit into.

The base may be a loop and the loop fits around the gap filler and allows the gap wall to slide along the gap filler. When the base is attached to the gap filler the divider may extend away from the gap filler.

Additional features of the present disclosure will become apparent from the following description and appended claims, taken in conjunction with the accompanying drawings.

DETAILED DESCRIPTION

Figure 1A:
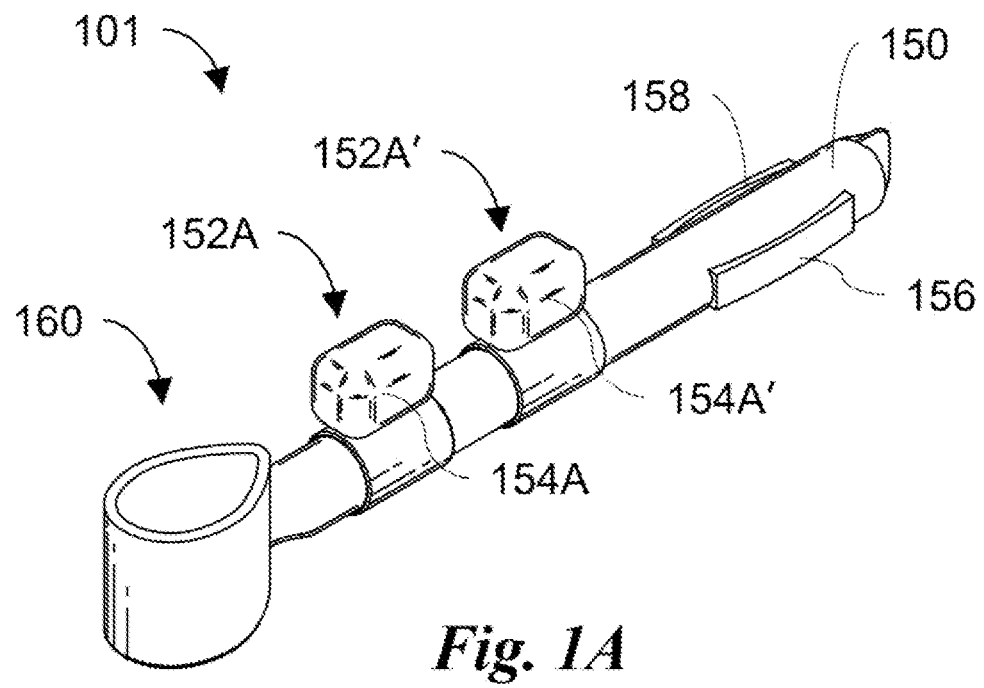
FIG. 1A illustrates a perspective view of a first gap pocket maker with a gap filler and two gap walls with longitudinal compressible square cross-section dividers.

FIG. 1A illustrates a perspective view of a first gap pocket maker 101, for example a Gap Stopper™, with a gap filler 150 and a front gap wall 152A and a rear gap wall 152A'.

The gap filler 150 is an elongated member with a front end and a tail end. The front end is shown with a holder 160. The tail end is shown with a right seatbelt latch opening formed by a right holder strap 158 and a left seatbelt latch opening formed by a left holder strap 156.

Although the gap filler 150 is depicted with seatbelt latch openings and the holder 160, having these items on the gap filler 150 are optional.

The holder straps 156 or 158 may be attached to the gap filler 150 by attaching the front end of the holder strap to the gap filler 150 and also attaching the tail end of the holder strap to the gap filler 150, forming an opening to accept a car seat belt latch. The right holder strap 158 and the gap filler 150 form a right seatbelt latch opening. The left holder strap 156 and the gap filler 150 form a left seatbelt latch opening. The holder straps 156 and 158 are shown longer front-to-back then top-to-bottom but any dimensions and proportions will work that will form a seatbelt latch opening that a vehicle seat belt latch may pass through. The holder straps 156 and 158 may be made of sturdy fabric and the holder straps may be non-stretchable. The holder straps 156 and 158 may be attached to the gap filler 150 by sewing, gluing, friction heat attachment, melting or any means that may create a permanent bond between the holder straps 156 and 158 and the gap filler 150. If the first gap pocket maker 101 is installed between a driver's seat and an adjacent barrier (e.g. a center console) then the left seatbelt latch opening may have the car seat belt latch pass through it and anchor the gap filler 150 in place so any seat movement will fail to dislodge the gap filler 150. If the first gap pocket maker 101 is installed between a passenger's seat and the center console then the right seatbelt latch opening may have the car seat belt latch pass through it and anchor the gap filler 150 so any seat movement will fail to dislodge the gap filler 150.

The front gap wall 152A has a longitudinal square compressible divider 154A that may be fabric covered with stuffing on the interior. The rear gap wall 152A' has a rear longitudinal square compressible divider 154A'.

The fabric cover member may be filled with stuffing for example a Polyester Fiberfill (for example, Poly-Fil®), soft foam pieces, spongy foam, air bags, bean bag fill, pillow stuffing or anything that can be compressed and will push back so that it can fill the gap and push to hold the gap wall in place when it is slipped in the gap between a seat and an adjacent barrier.

Figure 1B:
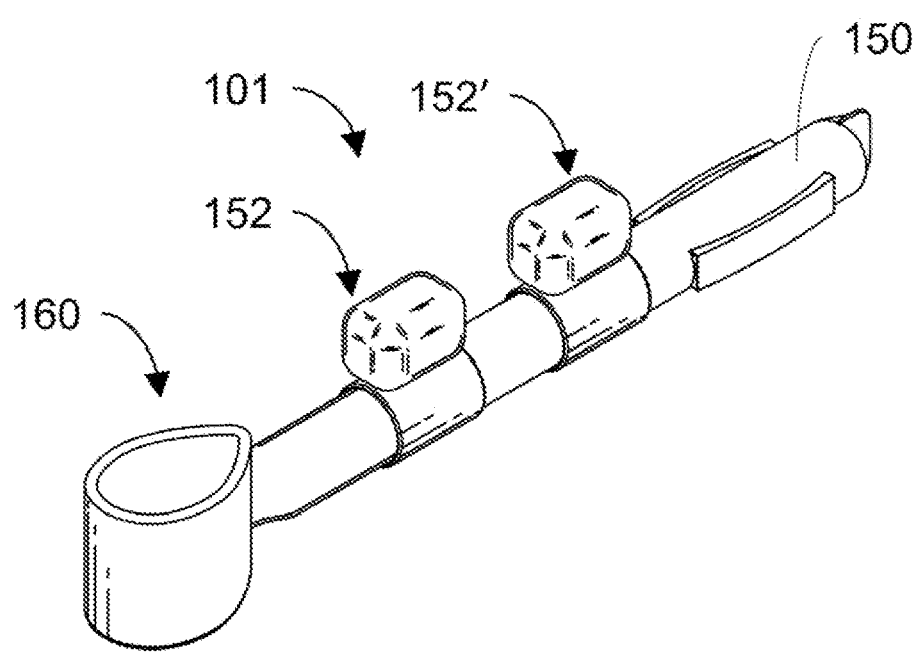
FIG. 1B illustrates a perspective view of the first gap pocket maker with the two gap walls moved into different positions on the gap filler.

FIG. 1B illustrates a perspective view of the first gap pocket maker 101 with the two gap walls 152 and 152' moved to different positions on the gap filler 150.

Figure 2:
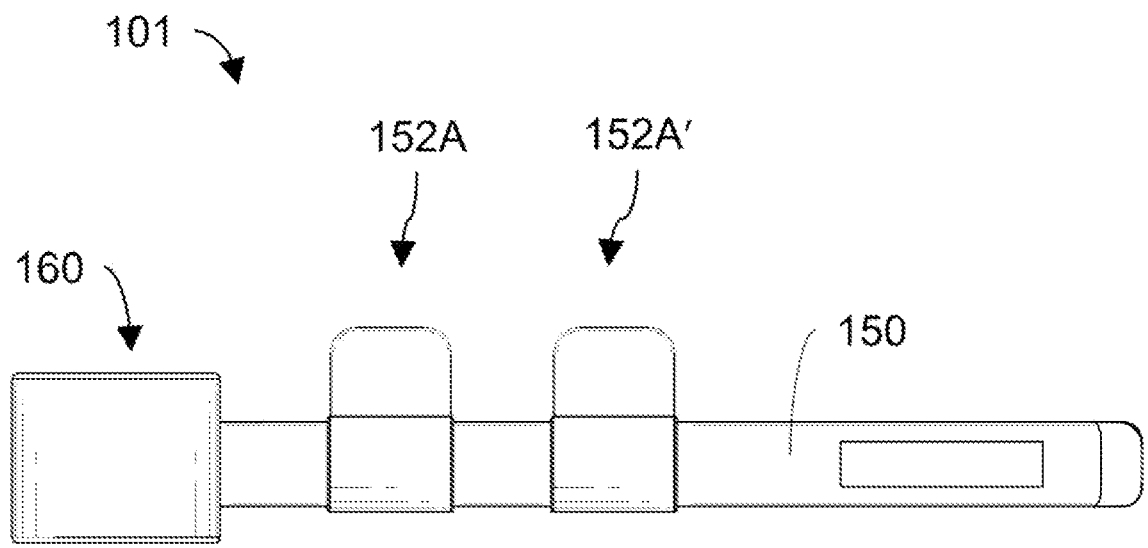
FIG. 2 illustrates a right-side view of the first gap pocket maker.

FIG. 2 illustrates a right-side view of the first gap pocket maker 101 with the two gap walls 152A and 152A' on the gap filler 150. The illustration shows the gap filler 150 with the holder 160.

Figure 3:
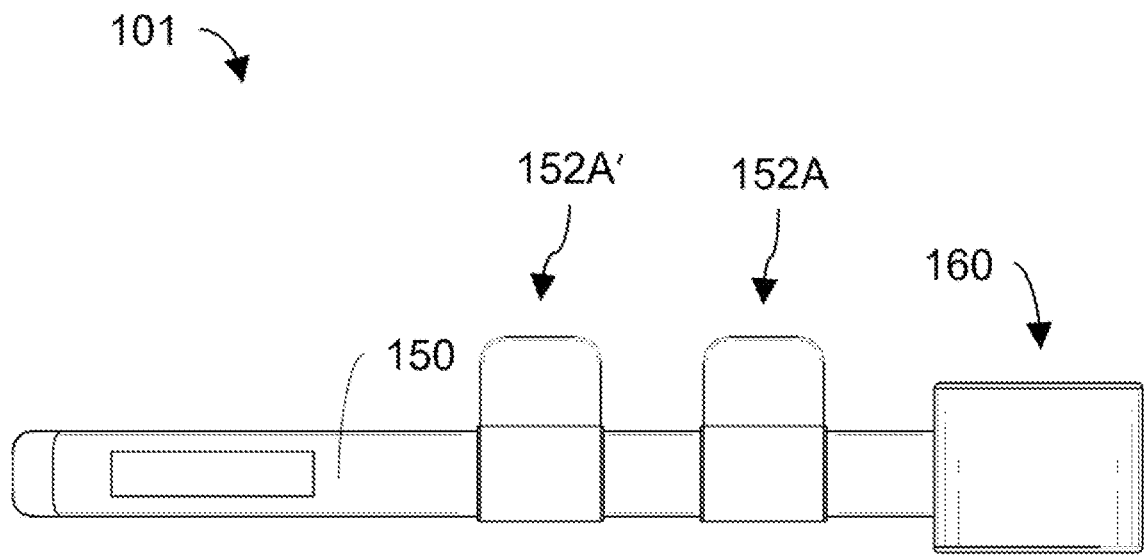
FIG. 3 illustrates a left-side view of the first gap pocket maker.

FIG. 3 illustrates a left-side view of the first gap pocket maker 101 with the two gap walls 152A and 152A' on the gap filler 150. The illustration shows the gap filler 150 with the holder 160.

Figure 4:
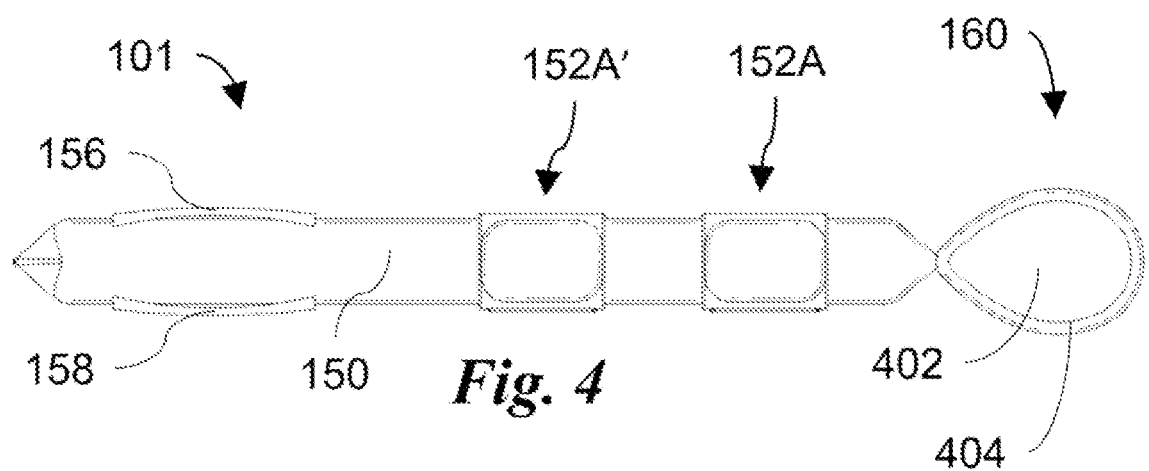
FIG. 4 illustrates a top-side view of the first gap pocket maker.

FIG. 4 illustrates a top-side view of the first gap pocket maker 101 with the two gap walls 152A and 152A' on the gap filler 150. The illustration shows the gap filler 150 with the left holder strap 156, the right holder strap 158 and the holder 160. The holder 160 may be detachable, for example by the use of a zipper, buttons, hooks, hook and loop fastener or anything that can affix the holder 160 to the gap tiller 150.

The holder 160 has a bottom 402 and a sidewall 404. The holder is designed so when the first gap pocket maker 101 is installed it extends beyond the front of the seat at the side of the seat, and can hold bigger items such as a bottle of water, a thermos, cell phone etc.

Figure 5:
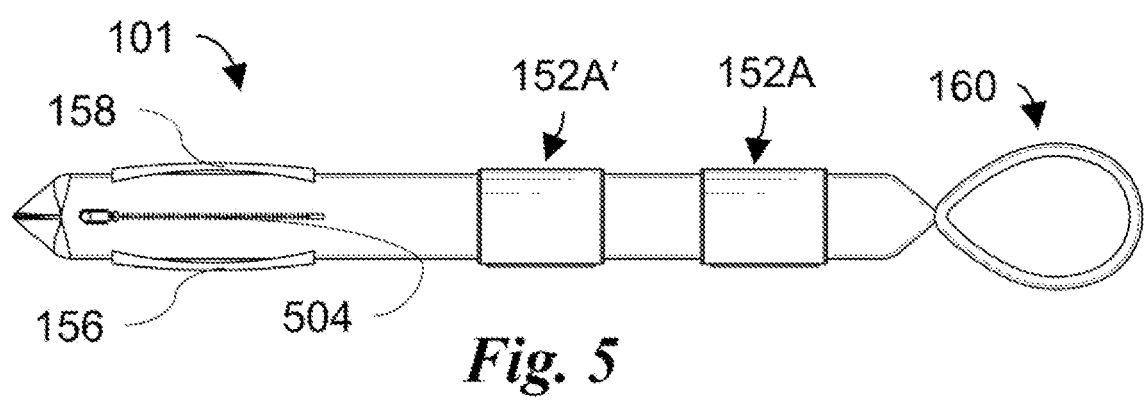
FIG. 5 illustrates a bottom-side view of the first gap pocket maker.

FIG. 5 illustrates a bottom-side view of the first gap pocket maker 101 with the two gap walls 152A and 152A' on the gap filler 150. The illustration shows the gap filler 150 with the right holder strap 158, the left holder strap 156, the holder 160 and a closable opening 504.

The closable opening 504 is shown with a zipper. The closable opening 504 may be opened to add or remove stuffing from the gap filler 150. The gap filler 150 may be a stuffed fabric container. When the first gap pocket maker 101 is installed, the stuffing will get compressed between the seat and the adjacent barrier, in this case the center console. It may be desirable to add more stuffing to make the fit tighter so that the gap pocket maker stays in place, or it may be necessary to remove stuffing so that the gap pocket maker may be able to be installed between the seat and the adjacent barrier. Although the closable opening 504 is shown as a zipper, the closable opening 504 may be created with other mechanisms for example hook and loop faster (e.g. Velcro®), or a lacing or any means that can allow the opening 504 to be closed. The closable opening 504 is shown on the bottom but it may be located elsewhere on the gap filler 150.

Figure 6:
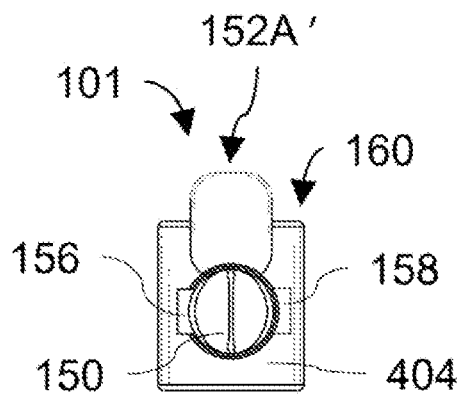
FIG. 6 illustrates a rear-side view of the first gap pocket maker.

FIG. 6 illustrates a rear-side view of the first gap pocket maker 101 with the rear gap wall 152A' on the gap tiller 150. The illustration shows the left holder strap 156 and the right holder strap 158 and the sidewall 404 of the holder 160.

Figure 7:
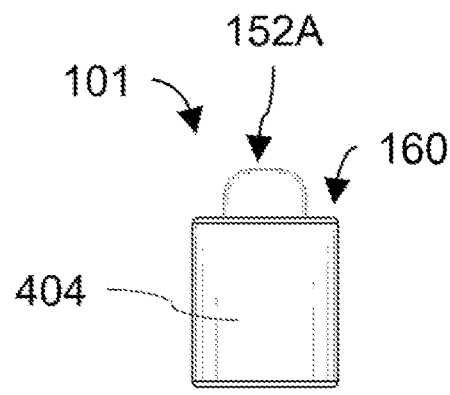
FIG. 7 illustrates a front-side view of the first gap pocket maker.

FIG. 7 illustrates a front-side view of the first gap pocket maker 101 with the front gap wall 152A. The illustration shows the sidewall 404 of the holder 160.

Figure 8:
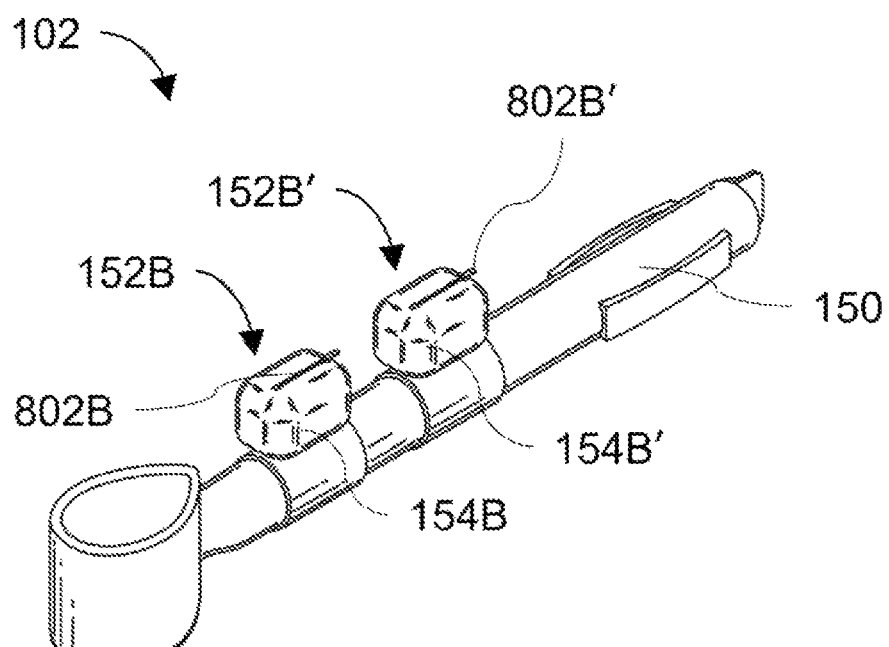
FIG. 8 illustrates a perspective view of a second gap pocket maker with a gap filler and two gap walls with compressible dividers where the compressible dividers have zippers.

FIG. 8 illustrates a perspective view of a second gap pocket maker 102 with a gap filler 150 and two gap walls 152B and 152B' with longitudinal square compressible dividers 154B and 154B'. The longitudinal square compressible dividers 154B and 154B' have divider closable openings 802B and 802B' respectively. The divider closable opening 802B and 802B' are shown with zippers. The divider closable opening 802B and 802B' allow stuffing to be added or removed from the longitudinal square compressible dividers 154B and 154B' to help get the right amount of stuffing in the divider as was discussed above regarding the closable opening 504. Although the closable opening 802B and 802B' is shown as a zipper, the closable opening 802B and 802B' may be created with other mechanisms for example book and loop faster (e.g. Velcro®), or a lacing or any means that can allow the opening 802B and 802B' to be closed.

Figure 9A:
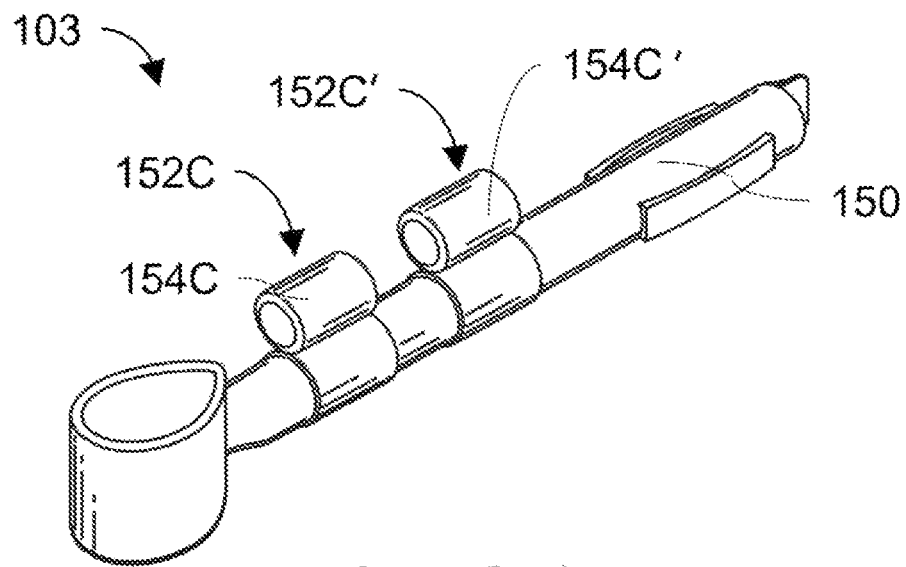
FIG. 9A illustrates a perspective view of a third gap pocket maker with a gap filler and two gap walls with longitudinal compressible cylinder shaped dividers.

FIG. 9A illustrates a perspective view of a third gap pocket maker 103 with a gap filler 150 and two gap walls 152C and 152C' with longitudinal compressible cylinder dividers 154C and 154C'.

Figure 9B:
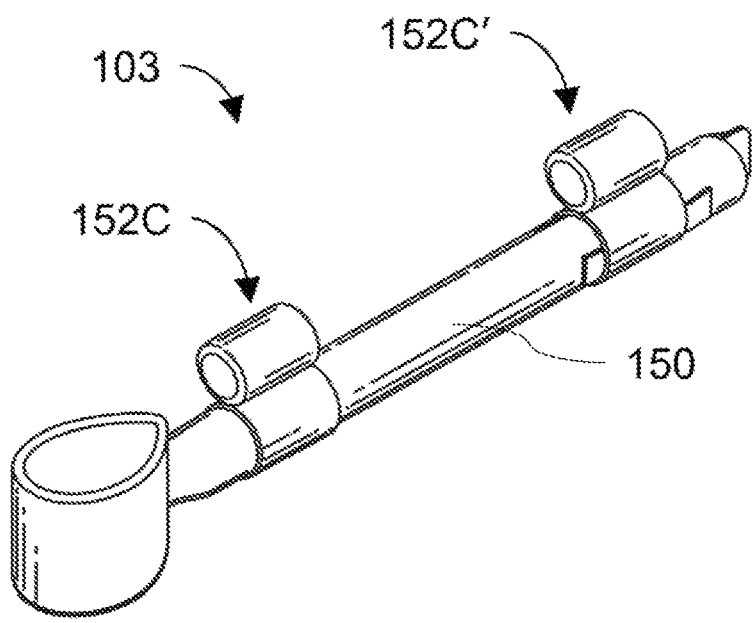
FIG. 9B illustrates a perspective view of the third gap pocket maker with the two gap walls moved into different positions on the gap filler.

FIG. 9B illustrates a perspective view of the third gap pocket maker 103 with the two gap walls 152C and 152C' moved into different positions on the gap filler 150.

Figure 10A:
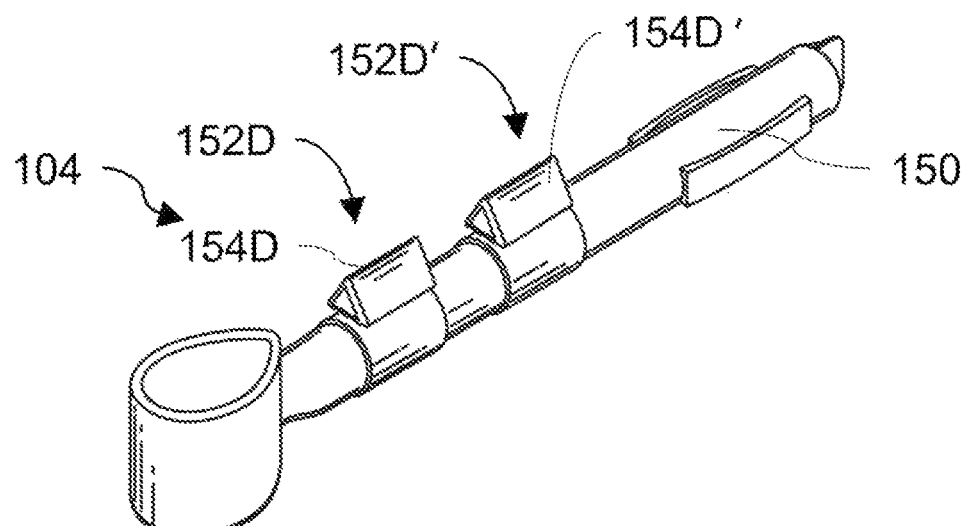
FIG. 10A illustrates a perspective view of a fourth gap pocket maker with a gap filler and two gap walls with longitudinal compressible triangle cross-section dividers.

FIG. 10A illustrates a perspective view of a fourth gap pocket maker 104 with a gap filler 150 and two gap walls 152D and 152D' with longitudinal compressible triangle cross-section dividers 154D and 154D'.

Figure 10B:
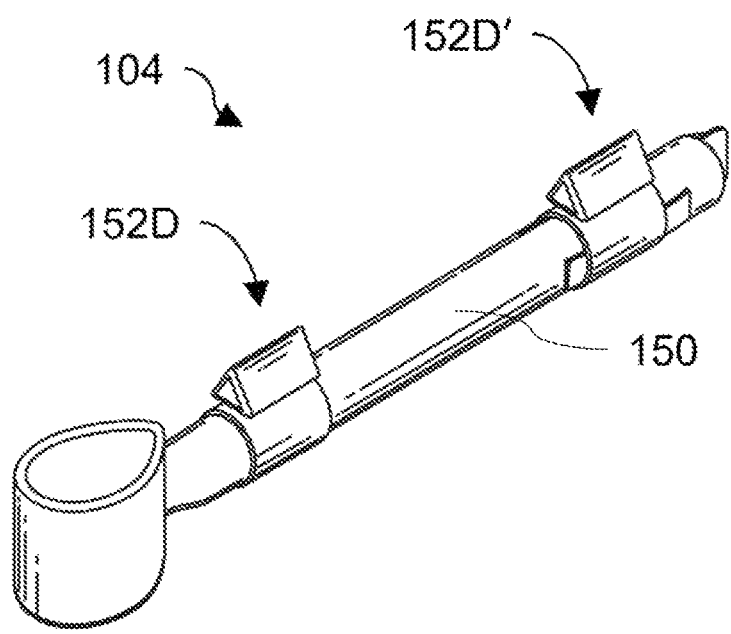
FIG. 10B illustrates a perspective view of the fourth gap pocket maker with the two gap walls moved into different positions on the gap filler.

FIG. 10B illustrates a perspective view of the fourth gap pocket maker with the two gap walls 152D and 152D' moved into different positions on the gap filler 150.

Figure 11A:
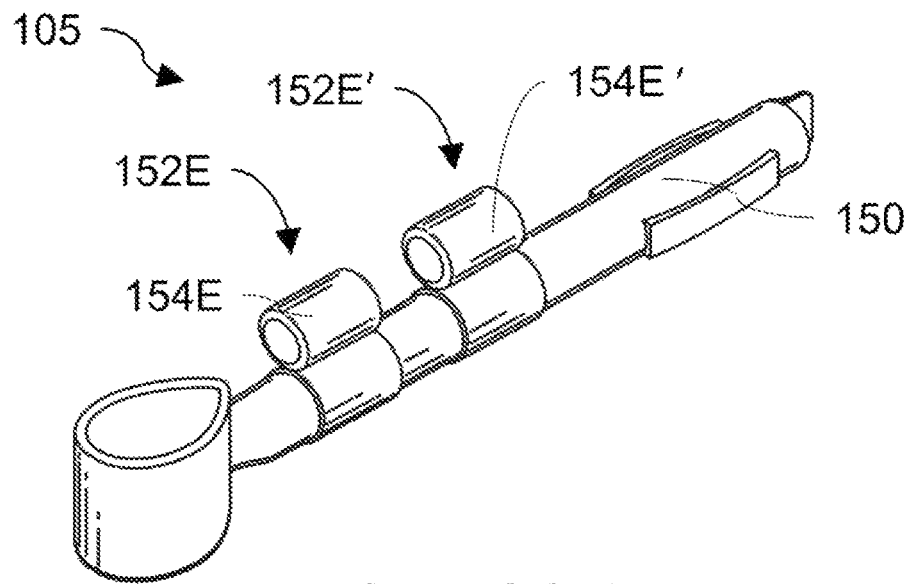
FIG. 11A illustrates a perspective view of a fifth gap pocket maker with a gap filler and two gap walls with longitudinal oval dividers.

FIG. 11A illustrates a perspective view of a fifth gap pocket maker 105 with a gap filler 150 and two gap walls 152E and 152E' with longitudinal oval dividers 154E and 154E'.

Figure 11B:
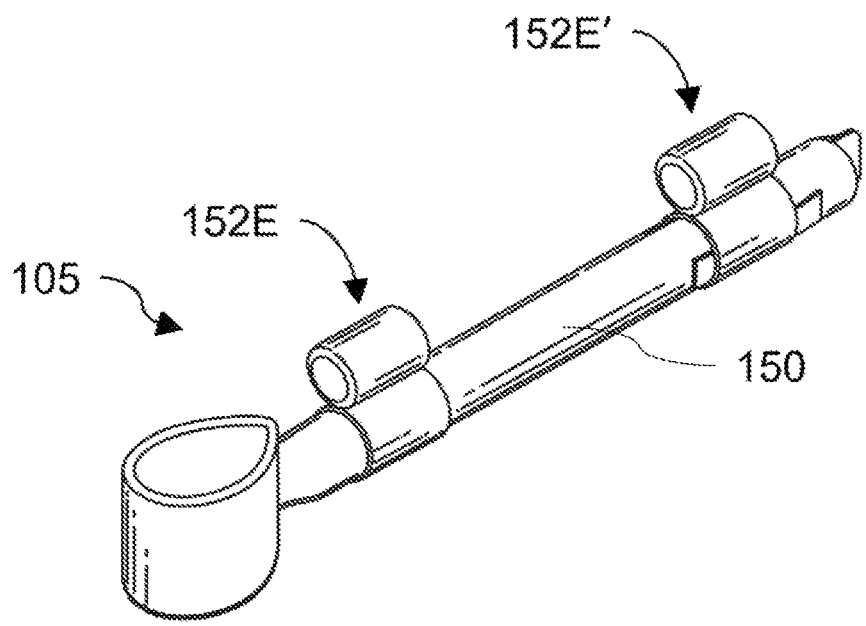
FIG. 11B illustrates a perspective view of the fifth gap pocket maker with the two gap walls moved into different positions on the gap filler.

FIG. 11B illustrates a perspective view of the fifth gap pocket maker with the two gap walls 152E and 152E' moved into different positions on the gap tiller 150.

Figure 12:
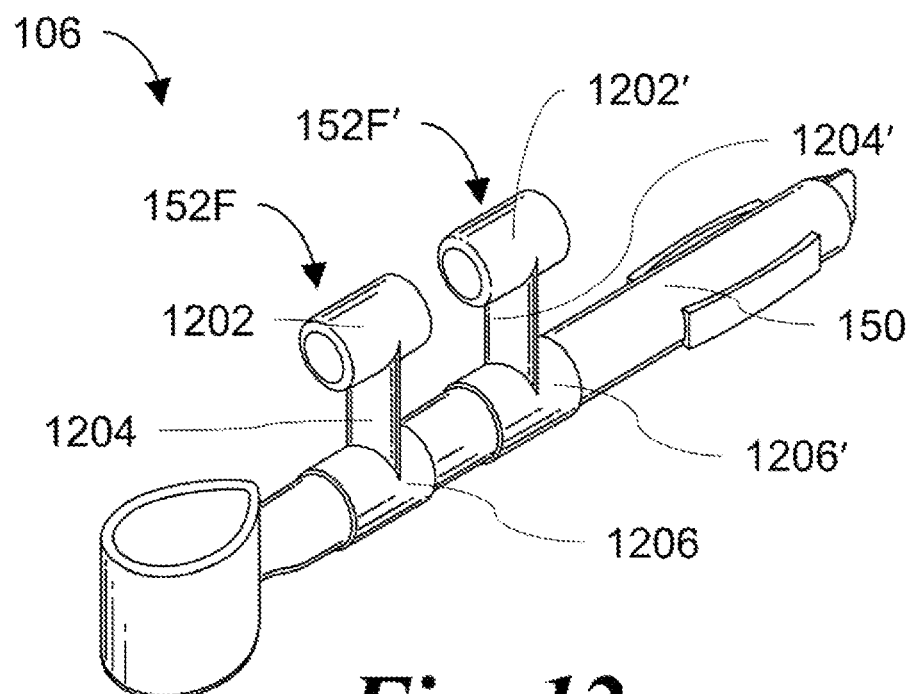
FIG. 12 illustrates a perspective view of a sixth gap pocket maker with a gap filler and two gap walls with longitudinal compressible cylinders on the end of a divider ribbon.

FIG. 12 illustrates a perspective view of a sixth gap pocket maker 106 with a gap filler 150 and two gap walls 152F and 152F' with longitudinal compressible cylinders 1202 and 1202' on the end of a divider ribbon 1204 and 1204' and the other end is a hoop base 1206 and 1206' respectively. The divider ribbon 1204 and 1204' may allow the gap wall to adjust vertically. The divider ribbon 1204 and 1204' may be made out of stretchable material. The divider ribbon 1204 and 1204' may spool up or be wound up to allow for the length of the ribbon to be adjusted and thus allow the vertical length to be adjusted.

The gap wall 152F has the longitudinal compressible cylinders 1202 that can be big enough to not be pulled down into the gap between the seat and the adjacent surface, but hanging down from the longitudinal compressible cylinder 1202 is the divider ribbon 1204, which may be elastic, and extends down to the hoop base 1206 that is attached to the gap filler 150. Although shown with just one central ribbon 1204, other configurations are possible. For example, two ribbons may be used with one on either end of the divider to align better to the ends of the longitudinal compressible cylinder 1202. Another example may use other combinations of material between a compressible cylinder and the base that would enable walls for pocket to be formed for example stretchable elastic material, or elastic combined with material to provide more of a box accordion extendable shape. Other configurations that allows for variable vertical height pocket walls that extends between the compressible cylinder and the base are possible.

The base is shown as a hoop base 1206 that can fit around the gap filler 150 and can slide along the gap filler 150. This allows the size of the pockets that are formed between the seat, the adjacent barrier, and two gap walls or a gap wall and another end like the holder, to be set according to the desires of the user. The base may be just the adhesive on the bottom end of the divider. The adhesive may allow for permanent attachment of the divider to the gap filler, or the adhesive may allow for the divider to be removed from the gap filler and repositioned.

The base may attach to the gap filler 150 using hook and loop faster (e.g. Velcro®). The base may have one side of a hook and loop fastener on the bottom end of the divider, with the other side on the gap filler 150. The hook and loop fastener may be sewn into the bottom end of the divider. The hook and loop base may be a larger piece that extends from the bottom of the divider sideways making a floor, or the hook and loop may extend down from the sides of the divider making something like legs. For example, if the base is flat the bottom could have book material on the bottom and with the gap filler 150 having loop material it may be possible for the gap wall to be repositioned on the gap filler 150 without having to remove the gap filler 150 from the gap. In another example, the base could have legs that hang down and straddle the gap filler 150 and these legs could have hook or loop material and the corresponding material could be on the gap filler 150. This may allow more rigid attachment of the gap wall to the gap filler 150. Any number of other configurations of the hook and loop material could enable the base to attach to the gap filler 150.

The base may attach to the gap filler 150 using a button or buttons. The buttons could be located the bottom end of the gap wall or on the top of the gap filler 150.

The base may attach to the gap filler 150 using stitching and being sewn in position. In general, the gap walls may be permanently attached and provide a fixed arrangement of pockets. The base may be the thread that attaches the divider to the gap wall.

The base may be made out of any material including but not limited to stuffing filled fabric, the fabric may be a flexible material, for example leather. The gap pocket maker with gap walls creates pocket area that utilizes space of the gap between a seat and an adjacent barrier. The gap walls may be used along with the side of the seat and the adjacent barrier to create a pocket with four sides and a bottom. The pocket may have on the bottom the gap filler 150 with the first side being the seat, the second side being a gap wall, the third side being the adjacent barrier and the fourth side either being another gap wall or some other barrier like the holder 160 or the car seat belt latch for example.

The adjacent barrier may be any number of items, for example in a car the adjacent barrier may be the center console, in a building the adjacent barrier may be a wall that is next to a seat, in an airplane the adjacent barrier may be the fuselage for the window seat, in boat or ship the adjacent barrier may be the hull that a seat is next to, in a stadium the adjacent barrier may be the support for the seat armrest of the adjacent seat. The adjacent barrier may be an adjacent seat in a row of seats. The adjacent barrier may be anything next to a seat that leaves a gap which the gap pocket maker could be installed into.

The base may attach the divider to the gap filler in any number of ways. The base may use a belt and buckle to attach the divider to the gap filler 150. The base may use a zipper to attach the divider to the gap filler 150. The base may use twine or other string through loopholes like sneakers to attach the divider to the gap filler 150.

Figure 13:
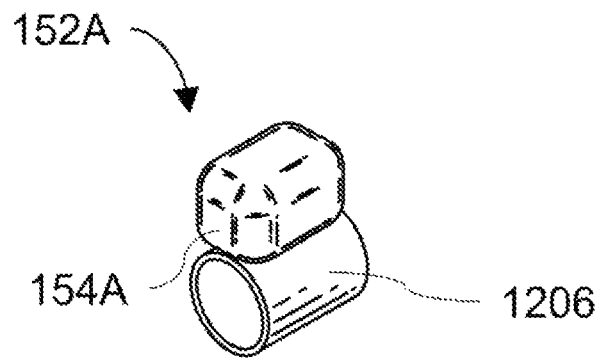
FIG. 13 illustrates a gap wall with a longitudinal compressible member divider and a base that is a hoop to fit around a gap filler.

FIG. 13 illustrates a gap wall 152A with a longitudinal square compressible divider 154A and a hoop base 1206. The longitudinal square compressible divider 154A being longer than it is wide, may align itself better to the gap as it is being installed between the seat and the adjacent barrier. Also, by having a longer body longitudinally, that is aligned to the main axis of the gap filler, it may provide a longer base and making it more likely that the divider will stand straight up and thus provide more convenient consistent pocket creation.

Figure 14:
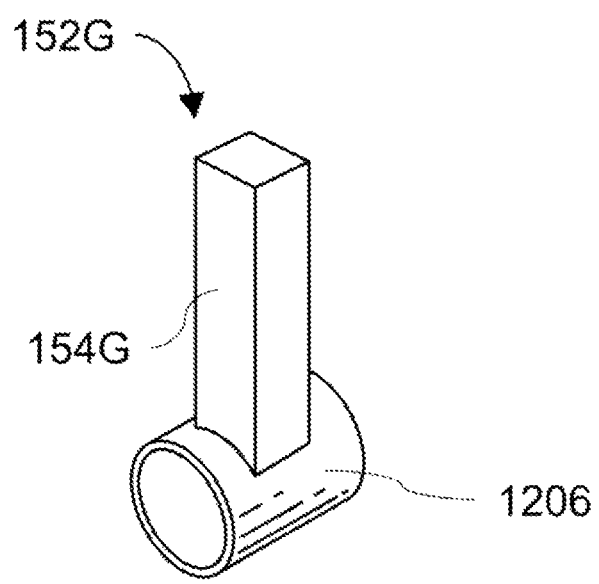
FIG. 14 illustrates a gap wall with a vertical square cross-section compressible divider and a base that is a hoop to fit around a gap filler.

FIG. 14 illustrates a gap wall 152G with a vertical square compressible divider 1540 and a hoop base 1206 to fit around a gap filler 150. The vertical square compressible divider 154G may provide the advantage of conserving space and making more pocket space available, and give nice clean squarer corners.

Any of the vertical compressible dividers may be vertically adjustable. For example, the divider may have two portions, a top portion with filling and a bottom portion that the top portion slides into or folds into.

Figure 15:
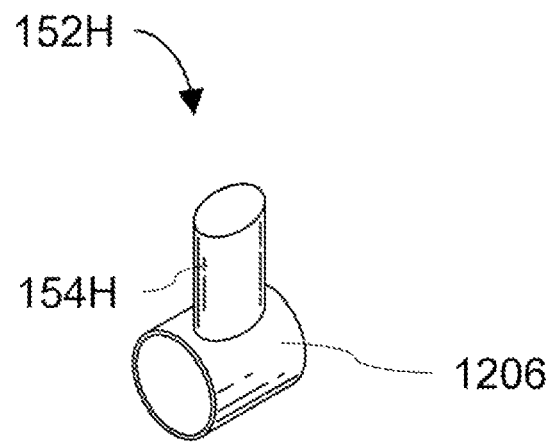
FIG. 15 illustrates a gap wall with a vertical oval cylinder compressible divider and a base that is a hoop to fit around a gap filler.

FIG. 15 illustrates a gap wall 152H with a vertical oval compressible divider 154H and a hoop base 1206 to fit around a gap filler 150. The vertical oval compressible divider 154H may be easier to slide and adjust the pocket wall compared to the vertical square compressible divider 154G (on FIG. 14) because it will not have corners to grip when trying to slide it while the gap pocket maker is installed.

Figure 16:
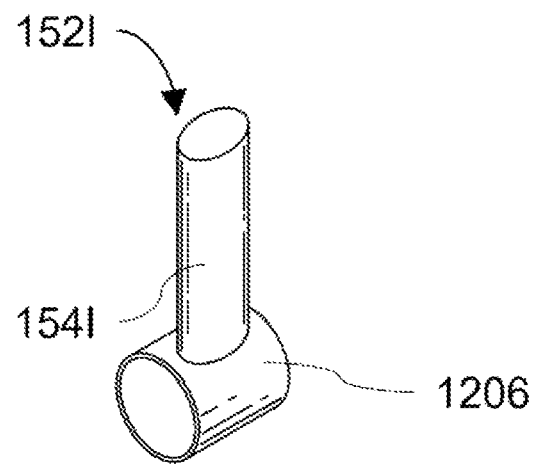
FIG. 16 illustrates a gap wall with a longer vertical oval cylinder compressible divider and a base that is a hoop to fit around a gap filler.

FIG. 16 illustrates a gap wall 152I with a longer vertical oval compressible divider 154I and a hoop base 1206 to fit around a gap filler 150. The longer vertical oval compressible divider 154I may extend up above the top of the seat and this may help items placed in the gap pocket to remain standing upright and be visible.

Figure 17:
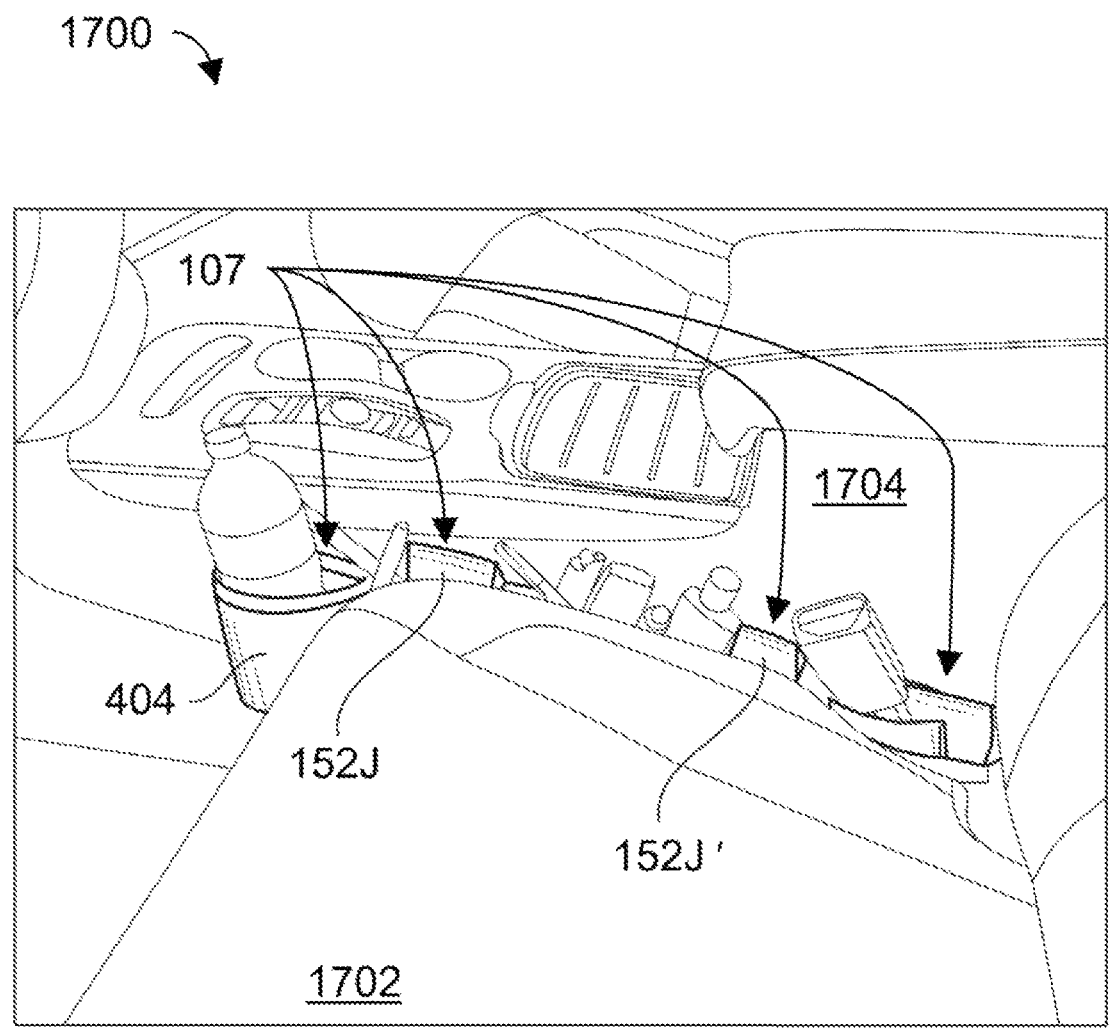
FIG. 17 illustrates a perspective view of a seventh gap pocket maker installed in a vehicle between the front driver seat and the adjacent barrier where the pockets created are holding and organizing various items.

FIG. 17 illustrates a perspective view 1700 of a seventh gap pocket maker 107 with gap walls 152J and 152J installed in a vehicle between the front driver seat 1702 and an adjacent barrier (i.e. the center console 1704), where the pockets created are shown holding and organizing various items.

Although the gap pocket maker is shown to be used in a car between the driver's seat and adjacent barrier of a center console, the gap pocket maker may be used anywhere that there is a seat and an adjacent barrier. For example, in a vehicle (for example, a car, an airplane, or a boat). Additionally, the gap pocket maker may be used anywhere there is a seat for example in a movie theater, a stadium, a bus, mass transportation system (subway, elevated train, train), or anywhere there is a seat and an adjacent barrier.

Additional features of the present disclosure will become apparent from the following description and appended claims, taken in conjunction with the accompanying drawings.

Accordingly, it is to be understood that the above description is intended to be illustrative and not restrictive. Many embodiments and applications other than the examples provided would be apparent upon reading the above description. The scope should not be determined with reference to the above description, but rather should instead be determined with reference to the appended claims along with the full scope of equivalents to which such claims are entitled. It is anticipated and expected that future developments will occur in the technologies discussed, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made in this document. The use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the disclosure. It is submitted with the understanding that it fails to impact or limit die scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of the disclosed embodiments. The following claims are hereby incorporated into the Detailed Description, with each claim standing on its own as separately claimed subject matter.

What is claimed is:

1. A gap wall comprising:
   a divider with a top end and a bottom end; and
   a base that is attached to the bottom end of the divider;
   where the base can attach to a gap filler such that when attached to the gap filler, and when the gap filler is installed between a seat and an adjacent barrier, a pocket is formed with the bottom being the gap filler, the first side being the seat, the second side being the gap wall, the third side being the adjacent barrier and the fourth side being either another gap wall or other barrier; and
   where the base has a hoop that can fit around the gap filler and allows the gap wall to slide along the gap filler.

2. A gap wall as claimed in claim 1, where the divider is compressible.

3. A gap wall as claimed in claim 2, where the divider has exterior fabric that creates an interior, and the interior has stuffing.

4. A gap wall as claimed in claim 3, where the exterior fabric is leather.

5. A gap wall as claimed in claim 1, where the gap wall has an interior, and the interior has stuffing.

6. A gap wall as claimed in claim 5, where the gap wall has a closable opening that can be used to adjust the amount of stuffing in the interior.

7. A gap wall as claimed in claim 6, where the closable opening uses a zipper.

8. A gap wall as claimed in claim 1, where the divider is flexible.

9. A gap pocket maker comprising:
   a gap filler that is an elongated member with one end of the elongated member being a tail end and, on the opposite end, a front end, and in between the tail end and the front end is a pocket bottom; and
   a gap wall, where the gap wall includes a divider and a base, where divider is attached to the base and where the base can attach to the gap filler and when attached the divider extends away from the pocket bottom of the gap filler
   where the base has a hoop that can fit around the gap filler and allows the gap wall to slide along the gap filler.

10. A gap pocket maker as claimed in claim 9, where the gap filler is cylindrical in shape.

11. A gap pocket maker as claimed in claim 9, where the front end has a holder with a bottom and a side wall and is open on the top forming an enclosure for holding items.

12. A gap pocket maker as claimed in claim 11, where the side wall, when viewed from the top, is tear drop shaped.

13. A gap pocket maker as claimed in claim 9, where the gap wall is compressible.

14. A gap pocket maker as claimed in claim 9, where the gap filler has an interior and a closable opening to access the interior that can be used to adjust the amount of stuffing in the interior.

15. A gap pocket maker as claimed in claim 14, where the closable opening has a zipper.

16. A gap pocket maker as claimed in claim 14, where the closable opening is located on the bottom.

17. A gap pocket maker comprising:
- a gap filler that is an elongated member with a tail end, a front end, a left side, a right side and a bottom side, where near the tail end is a left holder strap on the left side, the left holder strap is attached to the gap filler at the front of the left holder strap and at the back of the left holder strap creating a left opening for a first seat belt latch to fit into,
  and where near the tail end is a right holder strap on the right side, the right holder strap is attached to the gap filler at the front of the right holder strap and at the back of the right holder strap creating a right opening for a second seat belt latch to fit into,
  where the gap filler has a fabric exterior with an interior filled with stuffing, and where the gap filler has a zipper to allow stuffing to be added or removed from the interior, and where the front end has a holder and the holder has a bottom and a side wall that makes an enclosure that is open at the top, where the side wall is tear drop shaped when looked at from the top; and
- a gap wall, where the gap wall includes a divider and a base, where the divider is attached to the base and the base is a loop and the loop fits around the gap filler and allows the gap wall to slide along the gap filler, and where the base is attached to the gap filler and the divider extends away from the gap filler.

18. A gap pocket maker as claimed in claim 17, where the fabric exterior is leather.

* * * * *